Figure 1:
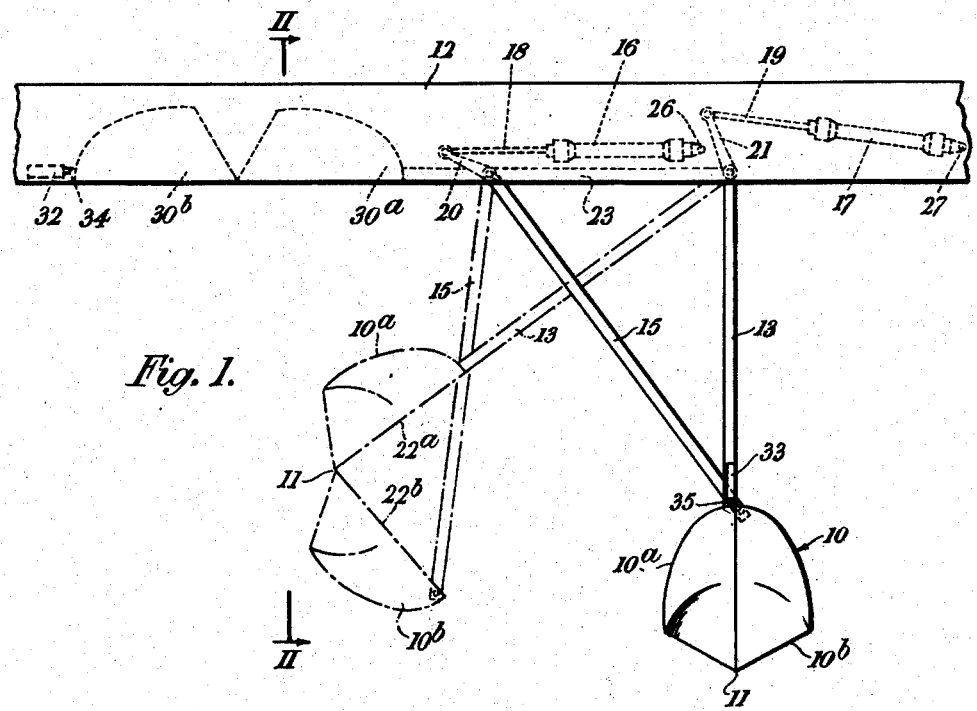

June 2, 1942.     P. R. DOWDEN ET AL     2,285,330
LATERAL STABILIZER FOR FLYING BOATS AND AMPHIBIANS
Filed April 26, 1940     3 Sheets-Sheet 1

Percy Reginald Dowden and
Henry Knowler Inventors

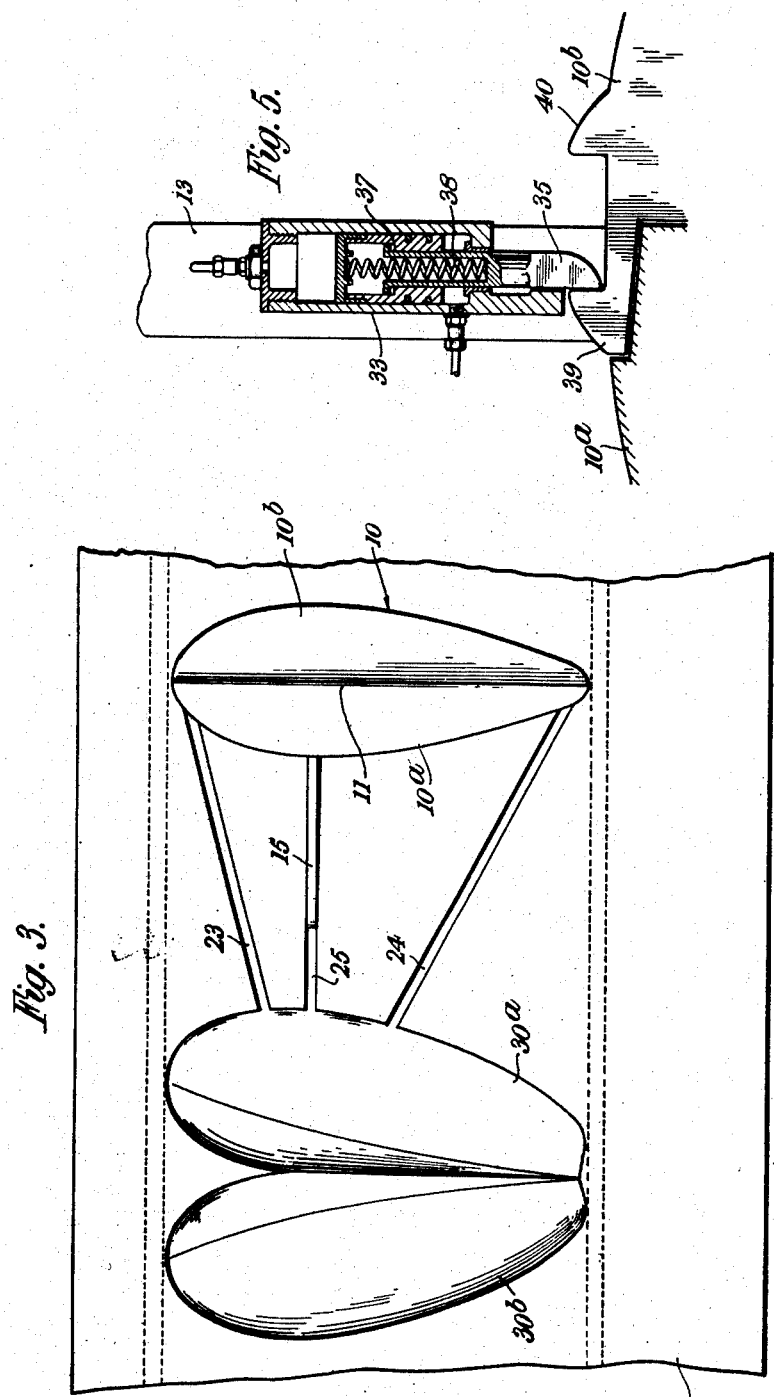

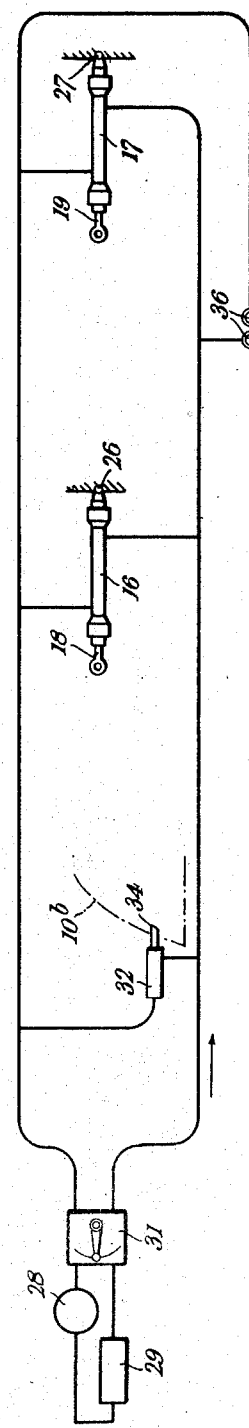
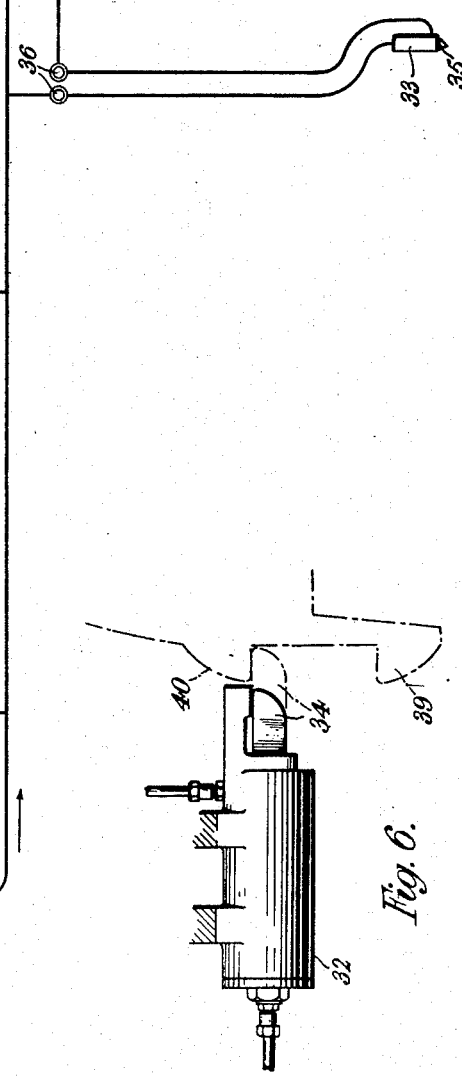

Patented June 2, 1942

2,285,330

UNITED STATES PATENT OFFICE 2,285,330

LATERAL STABILIZER FOR FLYING BOATS AND AMPHIBIANS

Percy Reginald Dowden, East Cowes, Isle of Wight, and Henry Knowler, Wootton, Isle of Wight, England, assignors to Saunders-Roe Limited, East Cowes, Isle of Wight, England Application April 26, 1940, Serial No. 331,852 In Great Britain April 26, 1939

2 Claims. (Cl. 244—102)

This invention relates to lateral stabilizing floats for flying boats and amphibian aircraft.

Usually such lateral stabilizing floats for flying boats and amphibian aircraft are constructed and mounted in such a manner that their position relatively to the wing is unaltered during taxying, taking-off, flight, alighting and when moored; thus causing aerodynamic resistance during flight when the lateral stabilizers are redundant.

The object of the present invention is to eliminate the aerodynamic resistance of the lateral stabilizers and mountings during flight, and yet obtain the stability effect required to meet the upsetting forces or other disturbing elements which tend to cant the flying boat or amphibian while taxying, taking-off, alighting or when moored.

It has previously been proposed to retract lateral stabilizing floats into recesses in the wings, but, owing to the limited space available in the wings and to the necessity for floats of ample buoyancy, it has not been found practicable to eliminate the whole of the resistance during flight.

The invention provides, in an aircraft, a laterally retractable stabilizing float formed of separate watertight portions connected by a fore and aft hinged joint, the hinged joint being closed in the down position of the float but being arranged to open, as the float is retracted, to permit of separation of the two portions thereof and their accommodation in separate recesses in the wing.

In this way it is possible to employ a float of sufficient width for it to serve as an effective lateral stabilizer and nevertheless, owing to the separation of the two parts thereof on retraction, to retract it completely into a thin wing.

In one arrangement according to the invention, the float is subdivided into two separate watertight portions along the longitudinal plane containing the keel. The two portions, which need not be of exactly similar shape, are hinged together along the keel line.

One portion is strutted to the wing by one or more struts rigidly connected to the float and hingeably connected at the attachment to the wing. The complementary portion of the float is also connected to the wing by one or more struts passing across the struts to the first portion. These struts are hingeably connected at both ends.

Suitably disposed positions are found for the wing connections so that when the floats are moved laterally and upwards the two portions hinge away from each other, the one part hinging directly into a recess in the underside of the wing and the other portion hinging about the keel line and under the restricting control of its strut or struts until it enters an adjacent wing recess provided for it. The struts also enter slots provided in the underside of the wing so that the whole system now lies substantially hidden in the wing.

The operating mechanism may consist of hydraulically operated levers, cables, or other means, and locks may be provided to hold the floats in both the operating and the retracted positions. Such locks may be operated by manual, mechanical, hydraulic or other mechanism.

One practical embodiment of the invention will now be described in further detail, by way of example, with reference to the accompanying drawings, in which—

Figure 2:
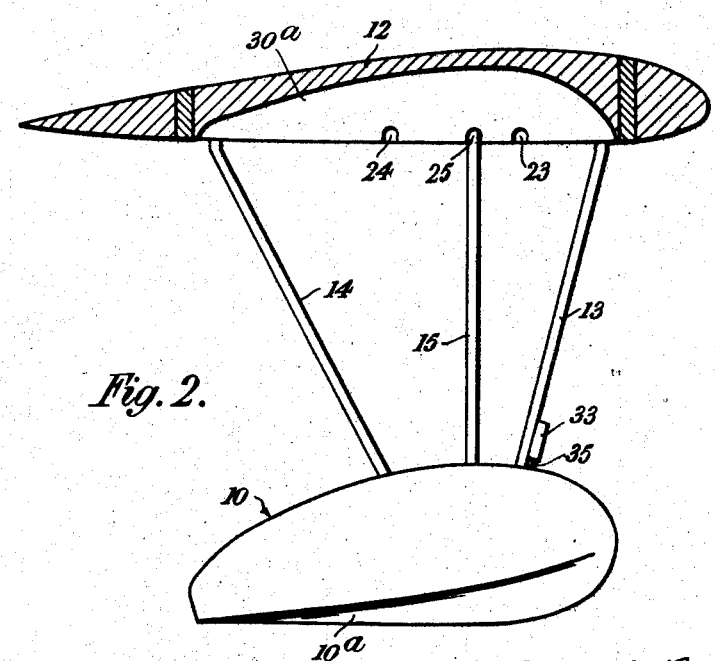

Figure 1 is a front elevation of a part of the aircraft showing the float in the down position, Figure 2 is a section along the line II—II in Figure 1, Figure 3 is the corresponding underside plan view, Figure 4 is a diagrammatic view of a hydraulic system for operating the retracting gear and locking devices, and Figures 5 and 6 are detail views of the locking devices for securing the float in the down and retracted positions respectively.

The lateral stabilizing float 10 is formed of two separate watertight portions 10$^a$, 10$^b$ separated along the longitudinal plane containing the keel and hinged together along the keel line 11.

The portion 10$^a$ of the float is connected to the wing 12 by two struts 13, 14 fixed at their lower ends to the float and pivoted at their upper ends to the wing. The other portion 10$^b$ of the float is connected to the wing by a strut 15, crossing the struts 13, 14 and pivoted at its opposite ends to the float and to the wing.

The retracting gear consists of a pair of hydraulic jacks 16, 17, the piston rods 18, 19 of which are connected respectively by levers 20, 21 to the struts 15 and 13, 14. In the down position of the float shown in full lines in Figure 1, the pistons of the jacks are at the left-hand ends of their respective cylinders. On movement of the pistons to the right however, the struts are caused to swing about their pivotal connections to the wing so as to retract the float laterally and in an inboard direction. As shown in chain-dotted lines in Figure 1, the portion 10ᵃ of the float swings bodily in an arc of a circle about the line joining the pivots at the upper ends of the struts 13, 14. The other portion 10ᵇ of the float is constrained however by its strut 15 to hinge gradually away from the portion 10ᵃ, until finally in the fully retracted position the previously contacting faces 22ᵃ, 22ᵇ of the two portions of the float lie parallel to one another, and the two portions of the float occupy separate recesses 30ᵃ, 30ᵇ in the wing. As shown in Figure 3, further recesses 23, 24, 25 are provided in the undersurface of the wing for the reception of the struts 13, 14, 15 respectively. The jacks 16, 17 are pivoted respectively at 26, 27 to the wing structure so as to permit the necessary arcuate movement of the levers 20, 21.

Owing to the fact that, on retraction, the two halves of the float hinge apart, the depth of the recesses 30ᵃ, 30ᵇ need only be equal to half the width of the float, so enabling the float to be completely retracted despite the relatively small depth of the wing.

The hydraulic system shown in Figure 4 includes a reservoir 28, a pump 29 and a control valve 31, by altering the setting of which the pump can be caused to pump oil in either direction, through a pipe system communicating with the retracting jacks 16, 17 and with locking jacks 32, 33 serving respectively for locking the float in the up and down position. As will be seen the four jacks are arranged in parallel, and Figure 4 shows the positions they occupy when the float is retracted. The latch 34 of the locking jack 32, which is mounted in the wing, is then in the operative position, while the latch 35 of the locking jack 33, which is mounted on the lower end of the strut 13, is withdrawn.

If now the control valve 31 is adjusted so as to cause the pump 29 to deliver oil in the direction indicated by the arrow, the latch 34 of the locking jack 32 will be withdrawn to free the float, the pistons in the jacks 16, 17 will be moved to the left, thereby lowering the float, and the latch 35 of the locking jack 33 will be projected so as to lock the float in the down position when it arrives there. Suitable joints, indicated diagrammatically at 36, are provided in the pipes leading to the locking jack 33 so as to permit of the supply of oil to the jack 33 despite the pivotal movement of the strut 13.

As shown in Figure 5, the latch 35 is slidably mounted on the piston 37 of the locking jack 33, and is normally urged outwards by a spring 38. It will be in the position shown in Figure 5, due to the oil having forced the piston 37 down, when the float reaches the lowered position. The hinged joint in the float will be closing and consequently the portion 10ᵇ of the float will approach the latch 35 from the right as seen in the figure. The curved face of a projecting lug 39 will then act on the curved face of the latch 35, thereby lifting it against the spring 38 to an extent sufficient to enable the lug 39 to pass the latch, whereupon the latter snaps back into the position illustrated. Its flat face then cooperates with the flat face of the lug 39 to lock the float securely in the down position.

The latch 34 of the locking jack 32 is similarly spring mounted and cooperates with a lug 40 on the float in a similar way. On retraction of the float the curved face of the lug 40 will cooperate with the curved face on the latch to force it back, and allow it to snap home behind the flat face of the lug to lock the float in the up position.

It will be understood that when it is desired to retract the float the control valve 31 is moved so as to permit the pump to circulate oil in the reverse direction, whereupon the latch 35 will be withdrawn, the latch 34 projected, and the jacks 16, 17 operated in the direction to retract the float.

Furthermore, although, in the arrangement illustrated, the recesses 30ᵃ, 30ᵇ in the wing which receive the two portions of the float are shown as entirely separate and distinct, they might form parts of a single elongated recess of reduced depth as compared with that required to accommodate an undivided float.

While a hydraulic retracting mechanism has been illustrated in the drawings, it should be understood that any convenient alternative may be used, for example an electrically operated gear supplemented by a hand operated mechanism for use in case of emergency.

What we claim as our invention and desire to secure by Letters Patent is:

1. In an aircraft, the combination of a wing, a stabilizing float divided along the longitudinal plane containing the keel into two separate watertight portions, a fore and aft hinged joint extending along the keel line and connecting the two portions of the float, a linkage for supporting the float in its operative position below the wing and with the two portions mated, and a device for operating on said linkage to retract the float laterally into the wing, the linkage being arranged, on retraction, to open the hinge and separate the two portions of the float, to enable them to be accommodated side by side in the wing.

2. In an aircraft, the combination of a wing, a stabilizing float divided longitudinally into separate watertight portions each having a planing bottom, a fore and aft hinged joint connecting the two portions of the float, a strut fixed at one end to one portion of the float and pivoted at its other end to the wing on a fore and aft axis, a strut pivoted at its opposite ends on fore and aft axes to the other portion of the float and to the wing, and means for swinging the struts transversely and inboard about their pivotal attachments to the wing to retract the float into the wing, the struts being crossed so that, while the two portions of the float are mated in the lowered position they are caused to separate as the float is retracted.

PERCY REGINALD DOWDEN.
HENRY KNOWLER.